Patented June 3, 1930

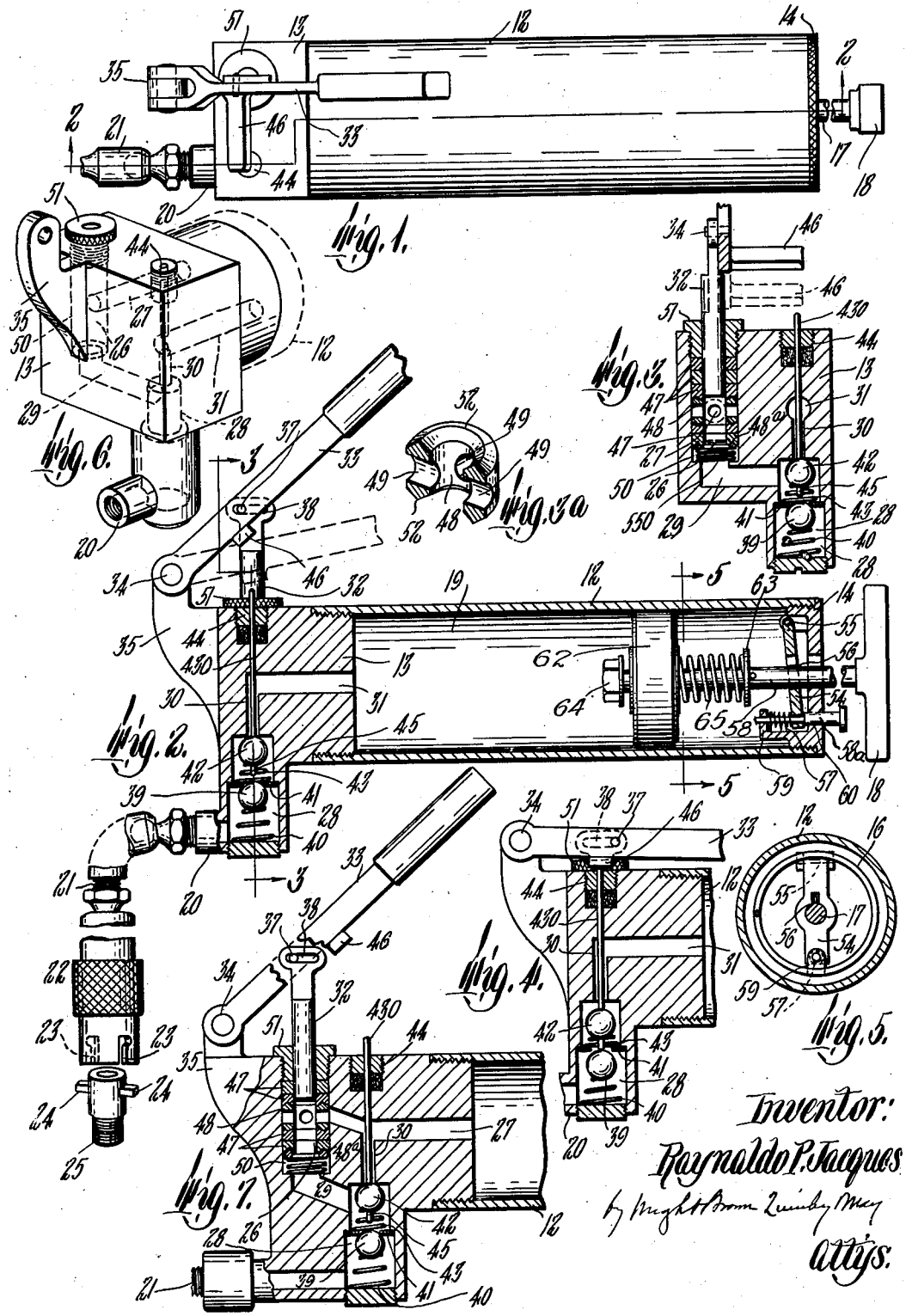

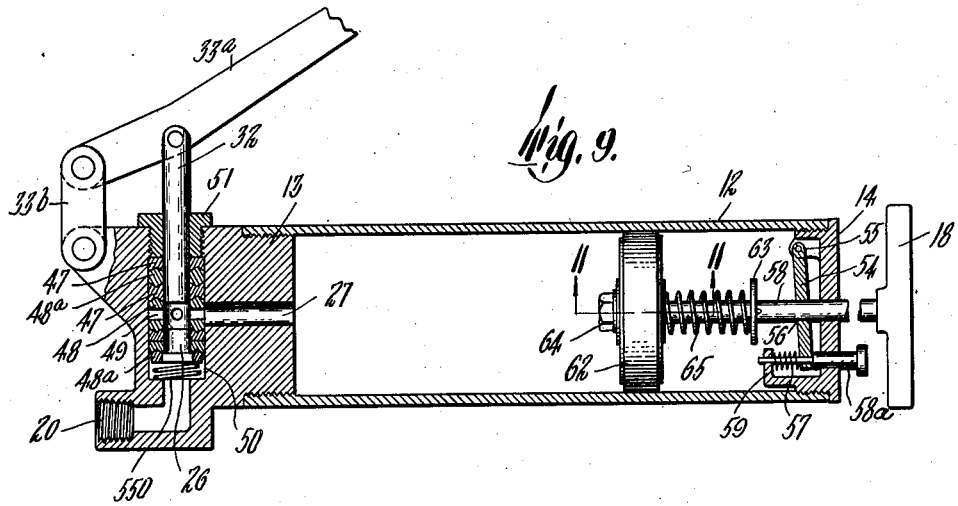
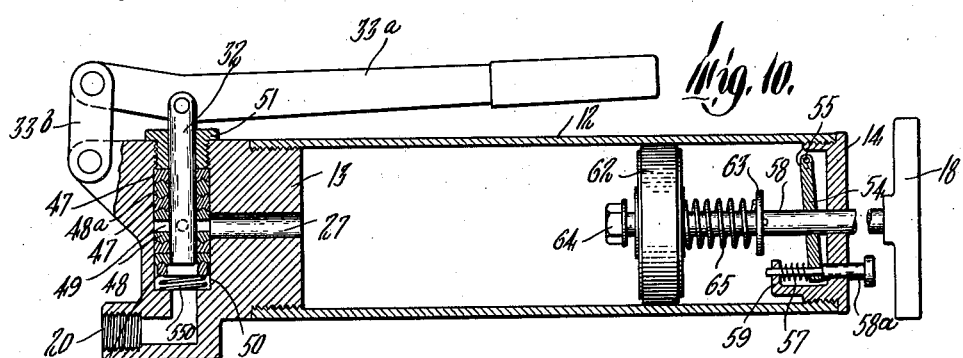
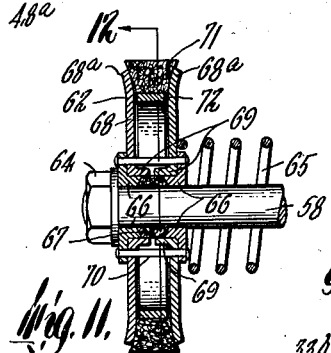
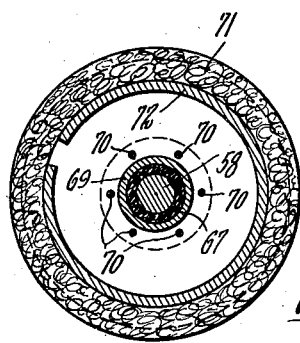
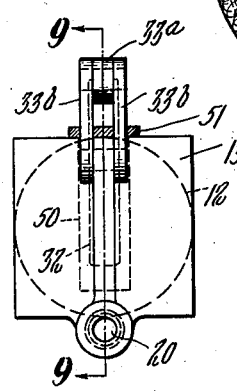

1,761,127

UNITED STATES PATENT OFFICE

RAYNALDO P. JACQUES, OF WOONSOCKET, RHODE ISLAND, ASSIGNOR TO ADAMS INDUSTRIES, INC., OF NEW YORK, N. Y., A CORPORATION OF NEW YORK

GREASE GUN

Application filed June 7, 1927. Serial No. 197,128.

This invention relates to a grease gun of the booster type, and comprising a grease container having a booster head, a piston adapted to force grease under moderate pressure into the head, and a booster plunger movable in a grease-conducting and plunger-guiding duct in the head to eject grease under higher pressure from the grease outlet of the head through a flexible conduit, and pack the grease in a compressed condition in a grease cup or nipple connected with the head outlet by the conduit, the grease being incidentally packed and compressed in the conduit also.

In a lubricating system including the above-mentioned elements, the grease cup or nipple fixed to and communicating with a bearing to be lubricated, is usually provided with bayonet-joint studs, the flexible conduit being provided at its free end with a coupling terminal having angular bayonet-joint slots constituting, with the studs, a well known form of bayonet-joint which is made by moving the coupling terminal endwise on to the nipple, and then partly rotating it, and is unmade by reversely rotating the terminal and then removing it from the nipple.

The angularity of the slots of the ordinary bayonet-joint is such that when grease is tightly packed and compressed in the nipple to cause it to effectively lubricate the bearing, it is a somewhat difficult matter to manually manipulate the coupling terminal in disengaging it from the nipple, the grease being so closely packed and compressed, not only in the nipple, but also in the conduit, that it is often necessary to employ a tool to turn the terminal to position for removal from the nipple.

One object of the invention is to provide a grease gun of the booster type, with means whereby the packed grease may be quickly relieved from compression, so that an unobstructed separation of the terminal from the nipple is permitted.

Another object is to provide a booster head having a grease-conducting and plunger-guiding duct, composed in part of compressible packing material, and adapted to closely pack the plunger and prevent leakage of grease around it.

Of the accompanying drawings forming a part of this specification,—

Figure 1 is a plan view of a grease gun having pressure-relieving means.

Figure 2 is a section on line 2—2 of Figure 1.

Figure 3 is a section on line 3—3 of Figure 2.

Figure 3ª is a perspective sectional view of the metal ring forming an element of the plunger duct hereinafter described.

Figure 4 is a view similar to a portion of Figure 2, showing the pressure-relieving positions of the check valves and lever shown by Figure 2.

Figure 5 is a section on line 5—5 of Figure 2.

Figure 6 is a perspective view of the booster head shown by Figures 1, 2, 3 and 4, and shows by dotted lines the duct system shown in part by Figures 2, 3, and 4.

Figure 7 is a view similar to a portion of Figure 2, showing a different arrangement of the ducts.

Figure 8 is an end view looking toward the outer end of the booster head, the pressure-relieving means being omitted.

Figure 9 is a section on line 9—9 of Figure 8.

Figure 10 is a view similar to Figure 9, illustrating a different stage of the operation.

Figure 11 is a fragmentary section on line 11—11 of Figure 9.

Figure 12 is a section on line 12—12 of Figure 11.

The same reference characters indicate the same parts in all of the figures.

The grease container comprises a barrel 12, a booster head 13, having a screw-thread connection with one end of the barrel, and a cap 14 having a similar connection with the opposite end of the barrel. A piston 62 is movable in the barrel, and is projected toward the head by a spring as hereinafter described, the cap guiding the piston-rod 58, which has a handle 18, by which the piston may be retracted. The head 13 is removable to permit the sucking of a charge of grease into the storage space 19 of the container, by the retraction of the piston.

The head 13 is provided with a grease outlet 20, with which is connected one end of a flexible conduit 21, of any suitable construction, having at its free end a coupling terminal 22, provided with the usual angular bayonet-joint slots 23, of which there are usually two. These slots are adapted to cooperate with bayonet-joint studs 24, on a grease cup or nipple 25, fixed to and communicating with a bearing (not shown) to be lubricated.

The head 13 contains a system of ducts connecting the storage space 19 with the outlet 20, and including a grease-conducting and plunger-guiding duct 26, hereinafter called the plunger duct, extending to the exterior of the head, a supply duct 27 (Figures 6 and 7) connecting the plunger duct 26 with the storage space, an outlet duct connecting the plunger duct with the head outlet 20, and including the portions 28 and 29 (Figure 3), and a pressure-relieving duct 30, communicating with the outlet duct 28, and with the storage space 19.

In the arrangement shown by Figures 2, 3, 4, and 6, the pressure-relieving duct 30 is connected with the storage space by a return duct 31, which is independent of the supply duct 27, through which grease passes from the storage space to the plunger duct, while in the arrangement shown by Figure 7, the pressure-relieving duct 30 communicates with the supply duct 27.

32 designates a booster plunger which is reciprocable in the duct 26, by an operating lever 33 fulcrumed at 34 to an ear 35 on the head, and engaged with the plunger to project and retract the latter. In this instance, the lever is provided with a stud 37, adapted to play in a slot 38, in the outer end of the plunger. When the plunger is retracted, it is raised above the supply duct 27, as shown by full lines in Figure 3, so that the plunger duct 26 receives grease forced from the storage space by the piston 62. When the plunger is projected it shuts off the supply duct 27, and forces grease from the plunger duct through the outlet duct portions 29, and 28, to the conduit 21 and nipple 25, the operation of the plunger being repeated until the nipple is sufficiently packed with compressed grease, which is packed also in the conduit. The compression of the grease in the nipple and conduit is maintained during the operation by a primary check valve 39, controlling the outlet duct portion 28. Said valve is pressed by a spring 40 against a seat 41, in the outlet duct portion 28, the arrangement being such that the valve is opened by grease pressure when the plunger is being projected, and closes when the plunger is being retracted. The pressure-relieving duct 30 is closed during the grease-forcing operation of the plunger, by a secondary check valve 42, controlling said duct, and pressed by a spring 43 against the receiving end thereof, as shown by Figures 2, 3 and 7. The secondary check valve 42, therefore, acts to prevent grease forced by the plunger from entering the pressure-relieving duct 30.

When the lever 33 is being moved to project the plunger and eject grease from the head outlet, its movement is limited by the operator to what I call a normal movement, the limit of which is indicated by dotted lines in Figures 2 and 3, so that the opening next described, of the check valves, does not occur. I provide means operable by an abnormal plunger-projecting movement of the lever beyond the limit shown by dotted lines, for opening the check valves and thereby relieving the pressure of compressed grease packed in the conduit and nipple, said means being embodied in a stem 430, fixed to the secondary valve and projecting from one side thereof, through the relieving duct 30, and through a guide 44 in the external surface of the head, and a teat 45, projecting from the opposite side of the secondary valve, and arranged to open the primary valve 39, when the secondary valve is opened. The projecting end of the stem 430 is normally in the path of an ear or projection 46, on the lever 33, and the arrangement is such that when the plunger-projecting movement of the lever is abnormal, so that the lever is moved beyond the limit shown by dotted lines, the lever depresses the valve stem and causes the opening of the check valves, as shown by Figure 4. The pressure of the compressed grease is, therefore, relieved, so that the terminal 22 may be freely manipulated to disengage it from the nipple 25.

The plunger duct 26, shown by Figures 3 and 7, is preferably formed by the bores of a plurality of compressible rings or washers 47 of leather or other suitable material, and a ring 48, of metal or other rigid material (Figure 3ª) interposed between two adjacent rings 47, and having a port 49. The rings are confined in a socket 50 in the head, by a gland 51, screwed into the head, the ring 48 being located so that its port 49 registers with the supply duct 27, which conducts grease from the storage space 19 to the plunger duct 28.

The ring 48 has annular wedge-shaped ends 52, best shown by Figure 3ª which indent and expand the compressible rings 47, between which the ring 48 is interposed, so that the said compressible rings have a close fit on the plunger and socket, and prevent leakage of grease around the plunger. The ring 48 may have a plurality of ports 49, either of which may register with the duct portion 27.

Another rigid ring 48ª (Figures 3, 7, 9 and 10) having an annular wedge-shaped end may be pressed by a spring 550, seated on the inner end of the socket 50, against the inner compressible ring 47. The spring exerts outward pressure on the series of rings, whereby the outer compressible ring is held in close contact with the gland 51.

To permit the locking of the piston-rod 58 to the cap 14, and the maintenance of the piston in various retracted positions I provide a clutch composed of an arm 54, pivoted at 55 to the cap and provided with an orifice 56 receiving the piston-rod, and formed to grip the rod and lock it to the cap, when the clutch-arm is held in the inclined position shown by Figure 2, by a spring 57. A push-rod 58ª, guided by the cap and by a fixed ear 59, within the barrel, supports the spring 57 between the ear and the clutch arm. The push-rod has a shoulder 60 bearing on the clutch-arm, so that the rod is projected outward from the cap when the clutch-arm is in its locking position. When the push-rod and clutch-arm are moved inwardly from the position shown by Figure 2 the piston-rod is released and is free to be projected toward the booster head, to cause the piston to force grease into the ducts in said head.

When the ducts are arranged as shown by Figures 2, 3, 4 and 6, the guide 44 and gland 51 are on a line extending crosswise of the container, and when said portions are arranged as shown by Figure 7, the guide and gland are arranged on a line extending lengthwise of the container.

The check valves may be opened by means independent of the lever 33, if desired. For example, the projection 46 may be omitted, and the valve stem 43a may be pushed inward by the operator to open the check valves.

Figures 8, 9 and 10, show a grease gun which includes the plunger duct construction above described, no pressure-relieving means being shown by these figures.

The plunger duct 26, (Figure 9) connected with the storage space by the supply duct 27, is formed by the bores of a greater number of rigid rings 48 and 48ª than the duct shown by Figures 3 and 7, and a corresponding number of compressible rings 47, alternating with the rigid rings. The rigid rings are provided with annular wedge-shaped ends like those of the ring 48, but are not provided with ports 49. The outer compressible ring 47 bears on the gland 51, and the rigid ring 48ª bears on the spring 55⁰, which exerts outward pressure on the inner end of the series of rings.

There being a plurality of rigid rings distributed through the series and laterally expanding a plurality of compressible rings, a greater length of the plunger is packed than by the arrangement shown by Figures 3 and 7.

In the embodiment shown by Figures 8, 9 and 10, the pressure-relieving duct 30, the secondary check valve 42, and its stem, and the projection 46 on the lever are omitted, so that the gun has no means for relieving pressure of grease packed thereby in the flexible conduit and the grease cup, the plunger duct being connected with the outlet 20, as before, by an outlet duct controlled by the check valve 39.

In another application filed concurrently herewith, entitled "Coupling terminal for conduits," I show a terminal at the free end of the flexible conduit of a grease gun, adapted to be freely manipulated to disconnect the conduit from a grease cup having bayonet-joint studs, without the resistance above described, caused by the compression of grease in the conduit. The employment of said terminal, therefore, enables me to dispense with the pressure-relieving means, if I so desire.

The piston may be operated by the means shown by Figures 2, 9 and 10, and next described.

The piston, designated as a whole by 62, is mounted to have a limited sliding movement on the piston-rod 58, which is guided by the cap 14. The rod has an inner stop 63, and an outer stop 64, spaced from the inner stop, the piston being slidable on the rod between the stops, and backed by a light spring 65 interposed between it and the inner stop, and holding the piston yieldingly against the outer stop 64.

The clutch-arm 54 and the means for operating it, are associated with the cap 14 and the piston-rod 58, as already described. The plunger-operating lever, here designated by 33ª may be pivoted to the plunger and connected with the booster-head by a link 33ᵇ.

The detachable connection of the booster-head with the barrel 12 enables the barrel to be charged by retracting the piston while the head is removed, the now open end of the barrel being inserted in a mass of grease, so that the retraction of the piston sucks grease into the storage space in the barrel.

The clutch-arm 54 is in locking engagement with the piston-rod only when it is held by the spring 57 in the inclined position shown by Figures 9 and 10, so that while it normally locks the piston-rod against rearward movement, it does not lock the rod against forward movement.

When the plunger 32 is retracted above the duct 27, its suction creates a partial vacuum in the plunger duct 26. The vacuum sucks a sufficient quantity of grease from the barrel to charge the plunger duct below the plunger, the piston-rod being free, as above stated, to move forward.

Each partial projection of the piston causes it to force the charge toward the booster-head. When the plunger is projected the spring 65 permits the piston to yield, as shown by Figure 10, so that the spring is additionally tensioned when the rod is locked, and thereafter causes the piston to exert pressure on the grease between it and the booster-head. This additional tensioning of the spring causes it to additionally project the piston after the piston-rod is locked, so that the piston causes grease to follow the plunger in the plunger duct, when the plunger is being retracted, thus ensuring a sufficient supply of grease in the path of the fully retracted plunger. The piston thus backed by a light spring is also adapted to yield to permit such back movement of grease from the plunger duct to or toward the barrel, as may be caused by the initial projection of the plunger, before it closes the supply duct 27.

The piston and the means last described for operating it, may be used in a grease gun having the described pressure-relieving means, in which case the relatively light spring 65, permits a freer yielding movement of the plunger to the back pressure of grease through the pressure-relieving duct 30, (Figures 2 and 3), than would be permitted by a stronger spring.

The piston 62 is slidable on the piston-rod, and is normally pressed by the spring 65 against the outer stop 64. The hub of the piston is formed by flanged annular members 66, slidable on the rod 58, and spaced apart thereon by an inner packing-ring 67, of compressible material. The sides of the piston are formed by annular plates 68, having flanges 69, bearing on the hub members 66, between the flanges thereof. Rivets 70, headed on the flanges of the hub members pass through said flanges and the plates 68. The plates have inclined outer edge portions 68ª and between these portions is interposed an outer packing-ring 71, of compressible material, having inclined sides. The spring 65 is seated on the inner plate 68 and presses the piston hub against the outer stop 64. The pressure of the spring also tends to cause the inclined portions 68ª to expand the packing-ring 71 against the internal surface of the barrel 12.

A split expansible ring 72 exerts outward pressure on the outer packing-ring 71, to additionally press it against the barrel. The inner packing-ring is pressed against the periphery of the piston-rod by the bevelled ends of the hub members 66, so that said ring prevents entrance of grease into the space between the side plates 68.

I claim:

1. A grease gun comprising a booster head having a grease outlet and a duct system connecting the outlet with the storage space of the gun, said system including a plunger-receiving duct, an outlet duct and a pressure-relieving duct, a plunger movable in the plunger duct, means for reciprocating the plunger, and spring-closed check valves including a primary valve normally permitting an outward movement of grease from the outlet duct, and preventing a return movement thereof, and a secondary valve normally preventing a return movement of grease through the pressure-relieving duct, means being provided for opening said valves to permit relief of pressure on grease packed by the plunger outside the head.

2. A grease gun comprising a container including a booster head, provided with a grease outlet and a flexible delivering conduit connected therewith, the head containing a duct system connecting the storage space with the grease outlet and including a plunger duct extending to the exterior of the head, a supply duct connecting the storage space with the plunger duct, and a pressure-relieving duct communicating with the outlet duct portion and with the storage space; a piston movable in the storage space to force grease therefrom into the duct system; a booster plunger reciprocable in the plunger duct; an operating lever fulcrumed on the head and engaged with the plunger to project and retract the same; a spring-closed primary check valve controlling the outlet duct and adapted to be opened by grease forced into the outlet and the conduit by the plunger, and normally closed to prevent back pressure in the outlet duct; a spring-closed secondary check valve controlling the pressure-relieving duct, and normally closed to prevent back pressure therein; and means operable by an abnormal plunger-projecting movement of the lever to simultaneously open the check valves to relieve pressure of grease packed in the outlet duct and conduit by normal plunger-projecting movements of the lever.

3. A grease gun as specified by claim 2, the valve-opening means comprising a stem fixed to the secondary valve and projecting from one side thereof through a guide in the head, its outer end being normally in the path of the operating lever, and displaceable to open the secondary valve by an abnormal movement of the lever, and a teat projecting from the opposite side of the secondary valve and arranged to open the primary valve when the secondary valve is opened.

4. A grease gun comprising a container formed in part by a booster head having a grease outlet and a duct system connecting the outlet with the storage space of the container, said system including a plunger duct, a supply duct connecting the plunger duct with the storage space, and an outlet duct connecting the plunger duct with the head outlet, a plunger movable in the plunger duct, and means for reciprocating the plunger, the head being provided with a socket, a plunger-receiving gland screwed into the mouth of the socket, and a series of rings confined in the socket by the gland, with their bores alined and forming the plunger duct, said rings including a rigid ring having a port coinciding with the inlet duct, and a plurality of compressible rings, between two of which the rigid ring is interposed, the compressible rings bearing closely on the plunger and the wall of the socket.

5. A grease gun comprising a container formed in part by a booster head having a grease outlet and a duct system connecting the outlet with the storage space of the container, said system including a plunger duct, a supply duct connecting the plunger duct with the storage space, and an outlet duct connecting the plunger duct with the head outlet, a plunger movable in the plunger duct, and means for reciprocating the plunger, the head being provided with a socket, a plunger-receiving gland screwed into the mouth of the socket, and a series of rings confined in the sockets by the gland, with their bores alined and forming the plunger duct, said rings including a rigid ring having a port coinciding with the inlet duct, and a plurality of compressible rings, between two of which the rigid ring is interposed, the compressible rings bearing closely on the plunger and the wall of the socket, the opposite annular ends of the rigid ring being wedge-shaped to laterally expand the compressible rings contacting therewith.

6. A grease gun comprising a container formed in part by a booster head having a grease outlet and a duct system connecting the outlet with the storage space of the container, said system including a plunger duct, a supply duct connecting the plunger duct with the storage space, and an outlet duct connecting the plunger duct with the head outlet, a plunger movable in the plunger duct, and means for reciprocating the plunger, the head being provided with a socket, a plunger-receiving gland screwed into the mouth of the socket, and a series of rings confined in the socket by the gland with their bores alined and forming the plunger duct, said rings including a plurality of rigid rings, one of which has a port coinciding with the inlet duct, said rigid rings having wedge-shaped annular ends, and a plurality of non-metallic compressible rings alternating with the rigid rings, and laterally expanded by the wedge-shaped ends thereof.

7. A grease gun comprising a container formed in part by a booster head having a grease outlet and a duct system connecting the outlet with the storage space of the container, said system including a plunger duct, a supply duct connecting the plunger duct with the storage space, and an outlet duct connecting the plunger duct with the head outlet, a plunger movable in the plunger duct, and means for reciprocating the plunger, the head being provided with a socket, a plunger-receiving gland screwed into the mouth of the socket, a series of rings confined in the socket by the gland, with their bores alined and forming the plunger duct, said rings including a rigid ring having a port coinciding with the inlet duct, and a plurality of compressible rings between two of which the rigid ring is interposed, the compressible rings bearing closely on the plunger and the wall of the socket, and a spring seated on the inner end of the socket and exerting pressure on the series of rings, to maintain the compression of the compressible rings.

8. A grease gun comprising a container including a barrel, a cap closing one end of the barrel, and a booster head closing the opposite end of the barrel, said head having a grease outlet and a duct system connecting the outlet with the storage space of the container and including a plunger duct, a supply duct connecting the plunger duct with the barrel, and an outlet duct connecting the plunger duct with the head outlet, a plunger movable in the plunger duct, a piston movable in the barrel and having a rod guided by the cap, and a spring normally projecting the piston toward the booster head, the piston being composed of spaced apart annular hub members slidable on the rod, an inner packing-ring embracing the rod between the hub members, spaced apart annular side plates seated on and secured to the hub members and having inclined outer portions, an outer packing-ring interposed between the said inclined portions, and expanded outwardly thereby, and a split normally expanded ring exerting outward pressure on the outer packing-ring, the piston-rod spring bearing on one side of the side plates and normally pressing the other side plate against the outer stop.

9. A grease gun comprising a booster head having a grease outlet and a duct system connecting the outlet with the storage space of the gun, said system including a plunger duct, and an outlet duct, a plunger movable in the plunger duct, a lever manually operable to project and retract the plunger, valves associated with the duct system and normally permitting an outward movement of grease from the outlet duct, and preventing a return movement thereof, so that grease is packed by the plunger outside the head by the normal operation of the grease gun, means operable by a plunger-projecting movement of said lever being provided for opening said valves to permit relief of pressure of the packed grease, said means including a pressure relieving duct included in the duct system.

In testimony whereof I have affixed my signature.

RAYNALDO P. JACQUES.